March 26, 1929. A. W. BURKE 1,707,185
DEVICE FOR CONTROLLING ELECTRIC CIRCUITS
Filed Jan. 19, 1926   2 Sheets-Sheet 1
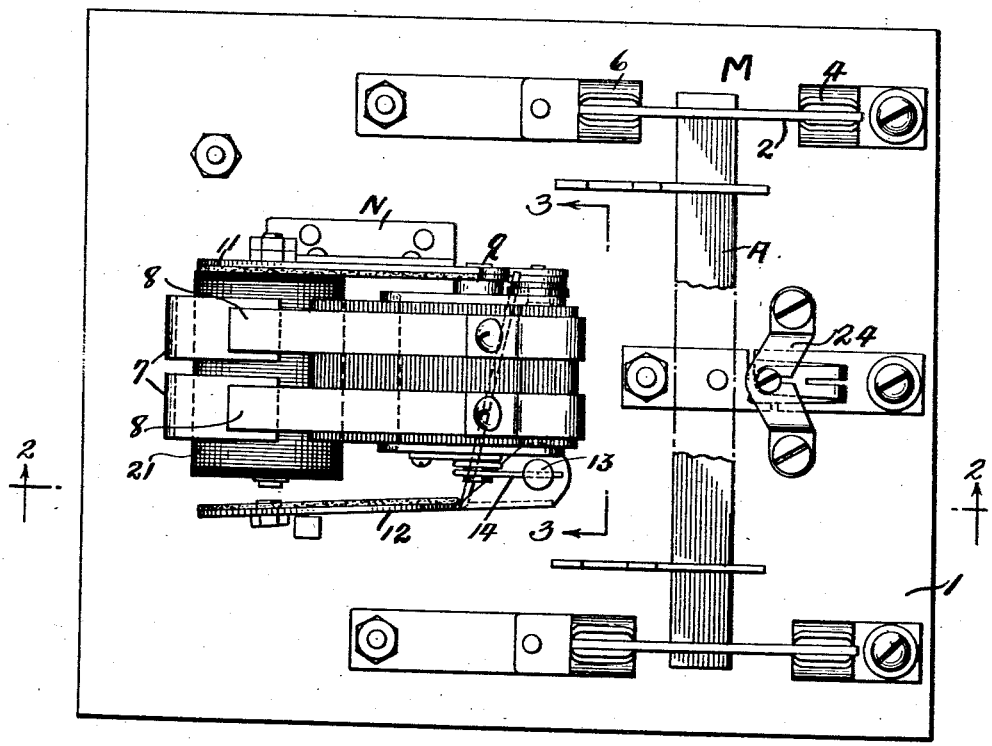
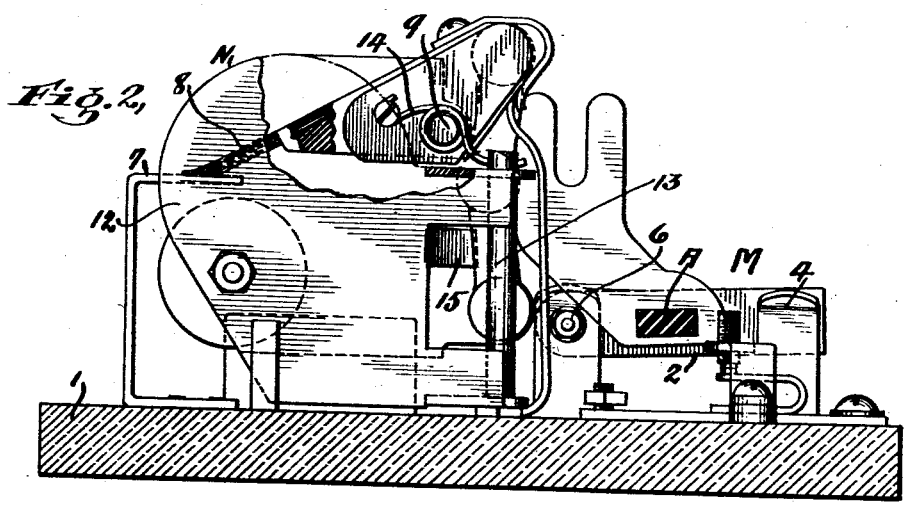
INVENTOR
Alfred W. Burke
BY
Riddle and Marquis
ATTORNEYS.

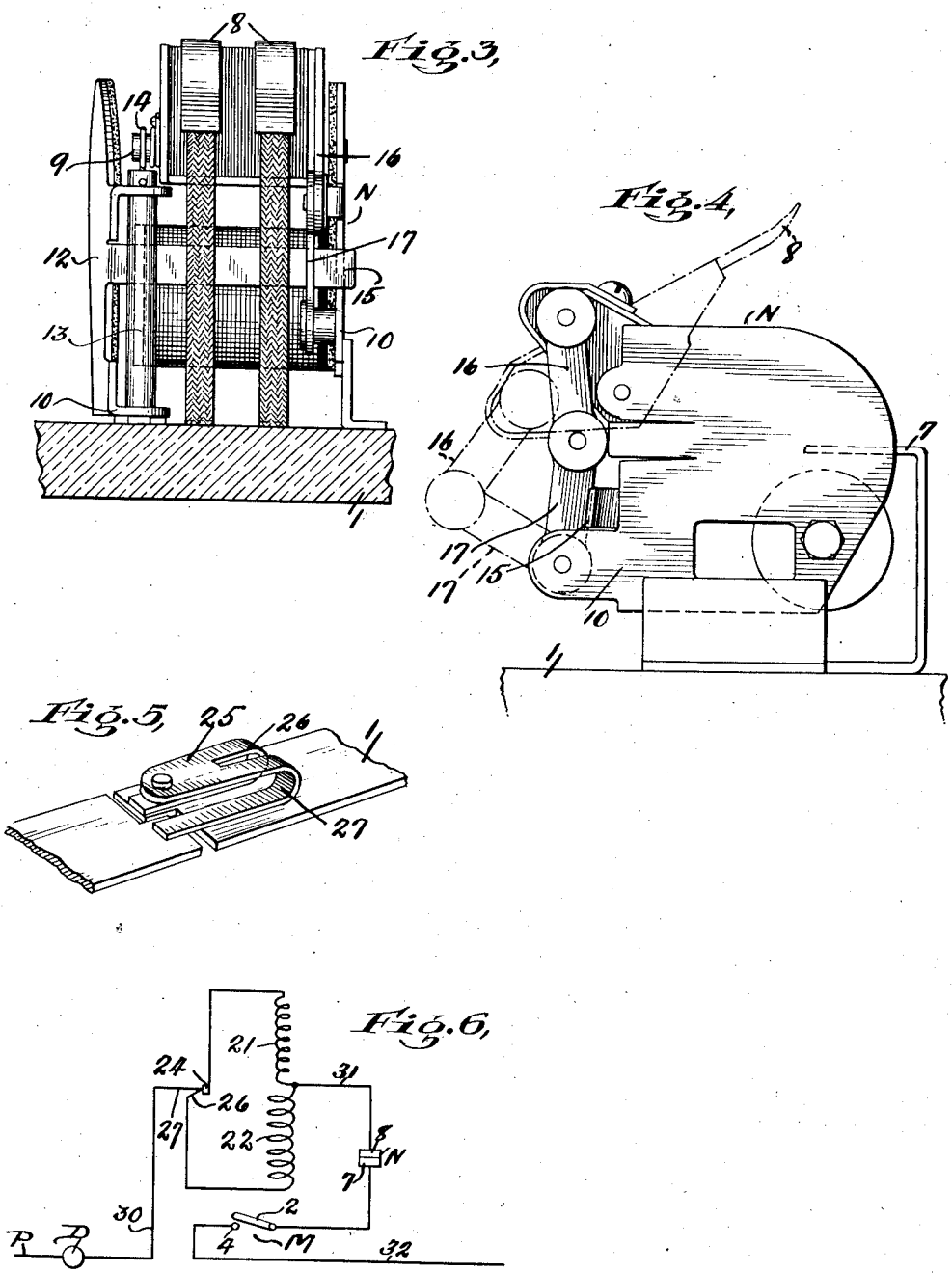

Patented Mar. 26, 1929.

1,707,185

UNITED STATES PATENT OFFICE.

ALFRED W. BURKE, OF PELHAM MANOR, NEW YORK, ASSIGNOR TO BURKE CONTROLLER CORPORATION, OF NEW YORK, N. Y., A CORPORATION OF NEW YORK.

DEVICE FOR CONTROLLING ELECTRIC CIRCUITS.

Application filed January 19, 1926. Serial No. 82,262.

My invention relates to devices for controlling electric circuits and has for one of its objects the provision of means controlled by conditions existing in the circuit being controlled whereby the said circuit will be automatically opened under predetermined conditions.

A further object of my invention is the provision of a device for controlling electric circuits of the character above indicated wherein a thermostatic control is provided, this thermostatic control being in turn controlled by conditions existing in the main circuit.

A still further object of my invention is the provision of a device for controlling electric circuits wherein a switch is provided in series with the circuit being controlled, this switch being opened automatically under predetermined conditions by reason of the provision of a thermostatically operated switch which is controlled by conditions existing in the main circuit or circuit being controlled.

A still further object of my invention is the provision of a device for controlling an electric circuit and comprising a coil which is in turn provided with two opposed windings, a thermostat being provided for automatically opening the circuit of one of said windings under predetermined conditions and the other winding under these conditions, that is to say, upon the functioning of the thermostatic device being operated to open the circuit being controlled.

A still further object of my invention is the provision of a device for controlling electric circuits in which a switch is provided in the circuit being controlled, said switch being operated by a coil in the circuit being controlled, said coil being so located with respect to the contacts of said switch as to extinguish any arc occurring at the contacts of said switch upon the opening of the same.

A further object of the present invention is the provision of a device of the character above indicated in which the opposed windings are controlled by a thermostatic switch so constructed and arranged and so connected in the circuit of said windings that "pumping" at the thermostatic device is prevented.

Another object of the present invention is the provision of means for effecting the automatic operation, that is to say, opening of an electric switch in an electric circuit, which it is desired to control, said means comprising opposed windings so constructed and arranged and so controlled that one of said windings will be effective under certain conditions to open the said switch, the resultant action of both windings under other conditions being effective to open said switch.

In general, my improved device provides a unitary structure comprising what will be termed hereinafter, a main switch and an auxiliary switch, the latter being directed and controlled by a coil comprising two opposed windings, this coil being so placed with respect to the contacts of the auxiliary switch as to extinguish any arc which may occur at said contacts upon the opening of said auxiliary switch. In connection with the opposed windings of the coil I provide a thermostatic switch so connected in the circuit of the coil as to provide branch circuits for the main circuit or circuit being controlled, one side of the thermostatic switch being connected to one of these branch circuits, the other side being connected to the other branch circuit whereby the increased resistance at the contacts of the thermostat due to opening of these contacts, will not bring about what is commonly termed "pumping" in this art, but will result in more current flowing in or through the movable element of the thermostatic switch to insure movement of the same to open position.

In the accompanying drawings I have shown by way of illustration only one form of my improved device, Figure 1 showing the same in plan.

Figure 2 being a section on line 2—2 of Figure 1.

Figure 3 showing the apparatus as illustrated in Figure 1 looking at the same from right to left.

Figure 4 being a partial side elevational view of the apparatus shown in Figure 1.

Figure 5 showing the details of the thermostat employed.

Figure 6 being a wiring diagram showing a circuit arrangement of my improved apparatus.

Referring to the drawings in detail, first of all Figures 1 to 5 inclusive,—1 designates a panel adapted to carry my entire apparatus. On this panel I have illustrated a double pole single throw main switch designated M. In the wiring diagram to be described hereinafter, one side only of this switch has been shown connected in circuit for the sake of clarity, and for the same reason in describing the construction of this switch I will make specific reference to one side only of the same. The switch arm or movable contact 2 of this main switch is adapted to cooperate with a fixed contact 4 being pivoted as indicated at 6.

To one side of the main switch M, to the left as viewed in Figure 1, I provide an auxiliary switch N. The switches M and N are connected in series with each other as will be pointed out hereinafter in an electric circuit which it is desired to control. The auxiliary switch N comprises a fixed contact 7 and movable contact 8, the movable contact being in the form of an arm pivoted on a pin 9, this pin mounted in or carried by, in the present instance, the magnet yoke 10 of the switch. The side 11 of this magnet yoke plainly seen in Figure 1 is rigidly secured in any suitable manner to the panel 1, the other side of this yoke, which I will designate 12, functioning as an armature and being pivoted on a vertically extending pin or post 13 mounted on the panel 1.

The contact arm carrying the movable contact 8 of the auxiliary switch N as hereinbefore mentioned is pivoted on the pin 9 and on this pin I provide a coil spring 14 one end of which is attached to the switch arm in any suitable manner, while the other end is attached to the post or pin 13. This provides an arrangement whereby the movable contact or switch arm will be moved to and held in open position upon certain predetermined conditions to be pointed out hereinafter.

The armature 12 of the auxiliary switch N is provided with an offset arm which I will refer to as a trip arm, this arm being designated 15 and extending transversely of the switch. Pivoted to the magnet yoke member 10 is an arm 17, the other end of which is pivoted to one end of the arm 16, the other end of the arm 16 being pivotally attached to the switch arm 8. The trip arm 15 heretofore referred to is adapted to cooperate with the toggle mechanism provided by the arms 16 and 17 to break the toggle upon predetermined conditions arising in the circuit to be controlled, thereby permitting the spring 14 to function to move the movable contact 8 of the auxiliary switch N to open position.

The toggle mechanism is adapted to be moved to the full line position of Figure 4 which is its position when it is desired to hold the movable contact 8 in closed position by means of an arm A attached to the switch arm 2 of the main switch M—being merely necessary to throw this bar forward from right to left as viewed in Figure 1 to engage the toggle arms, the main switch then being thrown from left to right which is its closed position. As heretofore pointed out, the switch N is controlled by a coil of which the member 12 heretofore also referred to constitutes the armature, this coil comprising two opposed windings 21 and 22 which are shown diagrammatically in Figure 6. These two windings are so constructed and arranged that under certain predetermined conditions existing in the circuit to be controlled, as will be pointed out hereinafter, one of the windings will be effective to open the auxiliary switch N and hence open the circuit being controlled, it being remembered that the switches N and M are in series with each other and in series with the circuit being controlled so that the opening of the switch N will open the circuit. Under other conditions, as for instance, a short circuit in the line as distinguished from an overload the combined action of the two windings 21 and 22 will effect an opening of the auxiliary switch N.

At this time it may be well to point out the advantages of this arrangement and in this connection I may say that the two windings 21 and 22 are controlled by a thermostatic switch (presently to be referred to) and while such a switch is well adapted for opening a circuit, the overload or other condition existing which causes this switch to function must continue sufficiently long to heat up the thermostat enough to cause the same to open its contact. This is satisfactory in the case of an overload, that is to say an ordinary overload, but is not perhaps sufficient in case of a short circuit in the line, this condition requiring an instantaneous opening of the circuit to prevent damage to the apparatus. For this reason, therefore, the two windings 21 and 22 have been so designed as above pointed out as to in such a case, cause an instantaneous operation of the auxiliary switch N.

The thermostat comprises a fixed contact 24 connected to one end of the winding 21, and a thermostatic metal strip 25 provided with two arms or legs 26 and 27 connected to each other, the leg 27 being connected to the winding 22 while the leg 26 is connected in the circuit being controlled. It will be understood that I am speaking now mechanically and not electrically.

In the wiring diagram of Figure 6 the power circuit or circuit being controlled is designated P.

Coming now to the operation of my improved device,—assuming that the switches and various other parts of my apparatus are connected as shown on the diagram in Figure 6, it is merely necessary to throw the main switch M from right to left as viewed in Figure 1 to cause the arm A to strike the toggle arms 16 and 17 moving the same from the dotted line position of Figure 4 to the full line position in said figure, thereby carrying the center of the pivotal connection of the arms 16 and 17 to each other to the right of a line drawn through the center of the points of attachment of these arms to the movable contact 8 of the switch N and the magnet yoke of said switch.

This operation of the toggle arms carries the movable contact 8 to closed position. The switch arm 2 is then moved to the right again to carry the movable contact 2 into engagement with the fixed contact 4. The thermostatic switch is, of course, closed, and current can now flow from one side of the line through a lamp, motor or other device D, conductor 30, the legs 27 and 26 of the thermostat, winding 22, conductor 31, the contacts 8 and 7 of the auxiliary switch N, the contacts 2 and 4 of the main switch M and conductor 32 to the other side of the line.

A branch circuit is provided by way of conductor 30, the leg 27 of the thermostat, fixed contact 24 of said thermostat, winding 21, conductor 31, auxiliary switch N and main switch M.

As previously pointed out, under normal conditions the action of the opposed windings 21 and 22 is such that sufficient pull is not exerted upon the armature 12 to cause the same to be actuated upon an overload arising in the circuit being controlled. However, the increased current drawn from the line due to the overload will heat the arms 26 and 27 of the thermostat and cause the same to leave the fixed contact 24 thereby opening the circuit of the winding 21. This winding having been open-circuited, the winding 22 will be effective to actuate the armature 12, causing the trip arm attached thereto to break the toggle attached to the movable contact 8, thereby permitting the spring 14 to open the auxiliary switch N.

Referring again to the thermostat, it will be seen that as the arms 26 and 27 thereof begin their movement away from the fixed contact 24, the resistance in the circuit in which is located the winding 21, will increase, due to the movement of the arms 26 and 27 away from the fixed contact 24 with the result that there will be an increased flow of current through the arms 26 and 27 and winding 22 to continue the heating of the arms 26 and 27 to thereby insure that the same will not cool off as soon as they have left the fixed contact 24 to close upon the fixed contact 24 again until the abnormal condition in the circuit being controlled has been remedied. In other words, this arrangement provides against the thermostat cooling off and closing upon the fixed contact 24 again to again become heated up and to then cool off again to once more contact with the fixed contact 24, thereby causing what is termed a "pumping" action at the thermostat, which action is detrimental to the apparatus causing pitting of the thermostat.

In the case of a short circuit the windings 21 and 22 are so constructed and arranged as above pointed out that the tremendous increase in current drawn from the line due to the short circuit will cause the switch N to open instantaneously, that is to say without the time lag necessary to permit the thermostat to move away from its fixed contact 24.

It will be seen from the foregoing that I have provided an apparatus adapted for controlling an electric circuit and comprising a pair of opposed windings, the circuit of one of which is adapted to be thermostatically interrupted to cause or effect the opening of a switch which in turn is in the circuit being controlled.

While I have described one form of my improved apparatus, it is to be understood that the same is illustrative rather than definitive and that the same may be changed within the purview of my invention.

What I claim is:

1. A device for controlling an electric circuit comprising in combination a coil provided with two opposed windings, a thermally operated switch connected to said coil and providing when closed branch circuits for current flowing in the circuit being controlled, one of said branch circuits being interrupted upon the opening of said thermally operated switch.

2. A device for controlling an electric circuit, comprising in combination, a coil provided with two opposed windings, a thermally operated switch connected to said coil and providing when closed branch paths for the current flowing in said circuit, one only of said branch circuits being interrupted upon the opening of the thermally operated switch.

3. The combination of an electric switch, a coil composed of opposed windings, said coil being connected in series with said switch and a thermostatic switch connected across both of said windings for controlling the circuit of the same.

4. A device for controlling an electric switch comprising in combination a coil in series with said switch, said coil comprising opposed windings, an armature actuated thereby, means for open circuiting one of said windings to cause said switch to open, said armature when actuated and said windings forming a magnetic circuit to extinguish arcing at said contacts upon opening of the switch.

5. The combination of an electric switch, a coil for opening the same and comprising opposed windings, and a thermostatic switch comprising a fixed contact and a movable contact the fixed contact being in series with one of said windings and the movable contact in series with another of said windings.

6. The combination of an electric switch, a coil for effecting the opening of said switch, said coil being in series with said switch and comprising a pair of opposed windings, a thermostat comprising a fixed contact and a movable contact and so connected to said windings that the circuit of only one of said windings will be opened upon the opening of said thermostat.

7. The combination of an electric switch, a coil for effecting the opening of said switch, a thermostat controlling said coil, said thermostat comprising a fixed contact and a movable contact, the circuit through the movable contact of said thermostat remaining closed upon the operation of said switch.

8. The combination of an electric switch, a coil comprising opposed windings for effecting the opening of said switch, a thermostat comprising a fixed contact and a movable contact and connected to the windings of said coil, the opening of said thermostat effecting an interruption of the circuit to one of said windings, the circuit through the other contact and the other of said windings remaining uninterrupted.

9. In an electric circiut to be controlled, an electromagnetic switch in said circuit, a coil comprising opposed windings constituting a part of said electromagnetic switch and adapted, upon predetermined conditions in the circuit being controlled, to automatically open said switch, and a thermostatic switch connected to the opposed windings of said coil, to provide branch circuits, one of which passes through both contacts of said thermostatic switch, the other passing through the other contact of said thermostatic switch, the last mentioned circuit remaining uninterrupted upon the opening of said thermostatic switch.

10. In a device for controlling an electric circuit, the combination of a coil comprisopposed windings, and an electromagnetic switch provided in part by said windings in the circuit being controlled, a thermostatic switch for controlling said windings, said windings being operative upon one predetermined condition in the circuit being controlled to effect the opening of said electromagnetic switch, and upon another predetermined condition in said circiut to open the circuit of one of said windings to effect an opening of said electromagnetic switch.

11. In a device for controlling an electric circuit, the combination of an electric switch, a coil for causing an opening of said switch, said coil being in series with the circuit being controlled and composed of opposed windings, and a thermostatic control for said coil.

12. In a device for controlling an electric circuit, the combination of an electric switch, a coil for causing an opening of said switch, said coil being in series with the circuit being controlled and composed of opposed windings, and a thermostat for controlling one of said windings.

13. In a device for controlling an electric circuit, the combination of an electric switch, a coil in series with said switch and composed of opposed windings, and a thermostatic control for said coil.

14. In a device for controlling an electric circuit, the combination of an electric switch, a coil in series with said switch and composed of opposed windings, and a thermostat for controlling one of said windings.

This specification signed this 18th day of January, 1926.

ALFRED W. BURKE.